(12) United States Patent
Burr et al.

(10) Patent No.: US 7,765,412 B1
(45) Date of Patent: Jul. 27, 2010

(54) METHODS AND SYSTEMS FOR DYNAMICALLY CHANGING DEVICE OPERATING CONDITIONS

(76) Inventors: James B. Burr, 511 Broughton La., Foster City, CA (US) 94404; Kleanthes G. Koniaris, 861 University Ave., #10, Palo Alto, CA (US) 94301

( * ) Notice: Subject to any disclaimer, the term of this patent is extended or adjusted under 35 U.S.C. 154(b) by 872 days.

(21) Appl. No.: 11/540,117

(22) Filed: Sep. 29, 2006

(51) Int. Cl.
*G06F 1/00* (2006.01)
*G06F 1/32* (2006.01)

(52) U.S. Cl. .................. 713/300; 713/320; 713/323; 713/330; 324/760

(58) Field of Classification Search ................. 713/300, 713/320, 323, 330; 324/760
See application file for complete search history.

(56) References Cited

U.S. PATENT DOCUMENTS

| | | | |
|---|---|---|---|
| 6,885,233 B2 | 4/2005 | Huard et al. | |
| 7,345,460 B2 * | 3/2008 | Ma et al. | 323/283 |
| 7,411,436 B2 | 8/2008 | Fang et al. | |
| 7,475,320 B2 | 1/2009 | Knebel et al. | |
| 2003/0231021 A1 | 12/2003 | Alwardi et al. | |
| 2004/0046247 A1 * | 3/2004 | Tower | 257/708 |
| 2006/0167657 A1 | 7/2006 | Naffziger et al. | |
| 2006/0290365 A1 * | 12/2006 | Riedlinger et al. | 324/760 |

OTHER PUBLICATIONS

Non Final Office Action, Mail Date Oct. 15, 2009; U.S. Appl. No. 11/529,865.

* cited by examiner

*Primary Examiner*—Thomas Lee
*Assistant Examiner*—Michael J Brown

(57) ABSTRACT

Methods and systems for operating a semiconductor device (e.g., a processor) are described. The device is operating at a first operating condition and device temperature. The first operating condition for the device can be dynamically changed to a second operating condition. The second operating condition is selected considering the design operating life of the device.

22 Claims, 5 Drawing Sheets

METHODS AND SYSTEMS FOR DYNAMICALLY CHANGING DEVICE OPERATING CONDITIONS

BACKGROUND OF THE INVENTION

1. Field of the Invention

Embodiments of the present invention relate to the operation of semiconductor devices such as microprocessors.

2. Related Art

There are a number of aging and failure mechanisms that can physically affect a semiconductor device or integrated circuit (such as a microprocessor, etc.) and shorten its operating life. Based on studies of those mechanisms, predictions can be made of the effects of the device's operating conditions on the device's operating life. Using those predictions, designers can pick a design operating life and then specify operating limits (e.g., limits on voltage, temperature, etc.) that will allow the device to reach its design operating life. The operating limits are enforced during operation to prevent the device from exceeding those limits.

However, the device may operate at less than its operating limits. For example, to conserve power in a battery-powered computer system, it is desirable to reduce the voltage supplied to the microprocessor ("processor"). If the processor is executing a less demanding task, the frequency at which the processor is operating can be reduced, reducing the amount of voltage required by the processor and consequently reducing power consumption. By operating the processor at less than its prescribed operating limits, the operating life of the processor can be extended beyond its design operating life.

SUMMARY OF THE INVENTION

When a semiconductor device such as a processor operates at less than its operating limits, in essence it extends its operating life. That is, the operating lifetime for a processor operating at less than its operating limits would be predicted to exceed the processor's design operating lifetime. Methods and/or systems for operating a processor that can account for those times at which the processor operates at less than its specified operating limits would be advantageous. According to embodiments of the present invention, a semiconductor device such as a processor can be operated at, for example, higher voltages, temperatures and frequencies for periods of time that have an effect on the processor's operating life that is approximately equivalent to (but opposite of) the effect of operation at less than operating limits, without reducing the predicted (overall) operating life of the processor to less than its design operating life. Embodiments in accordance with the present invention provide this and other advantages.

BRIEF DESCRIPTION OF THE DRAWINGS

The accompanying drawings, which are incorporated in and form a part of this specification, illustrate embodiments of the present invention and, together with the description, serve to explain the principles of the invention. The drawings referred to in this description should not be understood as being drawn to scale except if specifically noted.

DETAILED DESCRIPTION OF THE INVENTION

Figure 1:
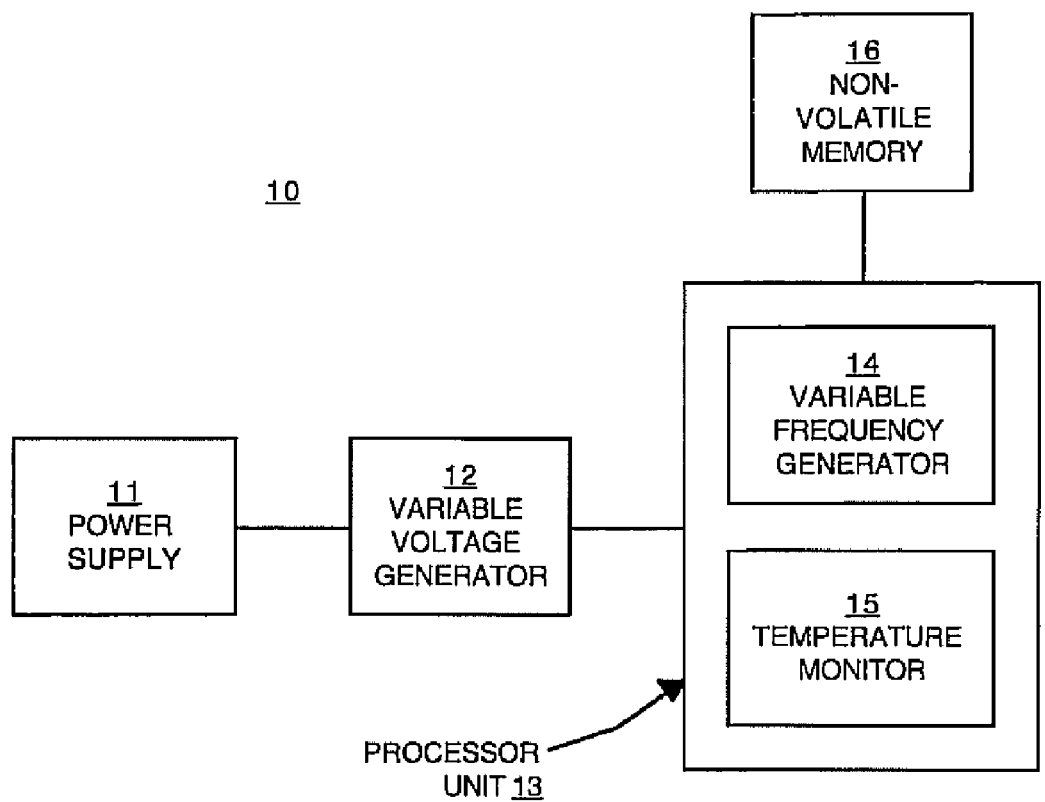
FIG. 1 is a block diagram showing elements of a computer system upon which embodiments of the present invention may be implemented.

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "changing," "determining," "selecting," "using," "transitioning," "quantifying" or the like, refer to the action and processes (e.g., flowchart 50 of FIG. 5) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention are described for microprocessor ("processor") operation. However, the present invention is not so limited. In general, embodiments in accordance with the present invention can be used with integrated circuits or semiconductor devices. More specifically, in addition to processors, embodiments in accordance with the present invention can be used with devices such as, but not limited to, microcontrollers and graphics chips.

FIG. 1 is a block diagram showing elements of a computer system 10 upon which embodiments of the present invention may be implemented. Relevant elements of a computer system are illustrated in FIG. 1. That is, computer system 10 can include elements other than those shown, such as volatile memory, a display device, a user interface device (e.g., a keyboard or mouse), and an input/output device allowing the computer system to be coupled to a peripheral device and/or to a network.

In the example of FIG. 1, computer system 10 includes a power supply 11, a variable voltage generator 12, a processor unit 13, and a nonvolatile memory 16.

In one embodiment, processor unit 13 incorporates a variable frequency generator 14 and a temperature monitor 15. Alternatively, the variable frequency generator 14 and/or the temperature monitor 15 may be separate from (external to) the processor unit 13. Also, variable voltage generator 12 may instead be incorporated into processor unit 13. In addition, nonvolatile memory 16 may be incorporated into processor unit 13.

Temperature monitor 15 measures the operating temperature of the processor unit 13. For example, temperature monitor 15 may measure the junction temperature of processor unit 13.

Power supply 11 supplies power to the various components of computer system 10. In the present embodiment, power to the processor unit 13 is supplied via the variable voltage generator 12. In one embodiment, power to variable frequency generator 14 is also supplied via variable voltage generator 12.

In response to commands from processor unit 13, variable voltage generator 12 can increase or decrease the amount of voltage supplied to processor unit 13 and variable frequency generator 14. Similarly, in response to commands from processor unit 13, variable frequency generator 14 can increase or decrease the frequency at which processor unit 13 is to operate. The changes to voltage and frequency are implemented with processor unit 13 still powered on and operable. That is, the changes to voltage and frequency are made without shutting down processor unit 13, and processor unit 13 can continue to execute instructions during the transition to the new voltage and frequency.

If, for example, processor unit 13 is executing instructions that are less processor-intensive, then processor unit 13 can operate at a reduced frequency. In general, processor frequency is roughly proportional to the square root of the voltage supplied to the processor. Thus, if processor unit 13 can operate satisfactorily at a reduced frequency, variable voltage generator 12 can decrease the voltage supplied to processor unit 13 and variable frequency generator 14, and variable frequency generator 14 can reduce the frequency.

Similarly, if processor unit 13 is executing instructions that are more processor-intensive, then variable voltage generator 12 can increase the voltage supplied to processor unit 13 and variable voltage generator 14, and variable voltage generator 14 can increase the frequency at which processor unit 13 is to operate.

Detailed models that relate frequency, voltage and temperature can be utilized to determine the amount that the supply voltage should be increased or decreased.

Voltage can be increased or decreased in a single step or in a series of smaller steps. In general, the voltage is increased or decreased in a manner that avoids a current surge that could cause a system reset, thereby enabling processor unit 13 to continue executing instructions during the change in voltage.

The discussion above describes one embodiment of a computer system and one embodiment of a processor in which the voltage supplied to the processor and the frequency at which the processor is to operate can both be varied. However, the present invention is not limited to the embodiment of FIG. 1.

Embodiments in accordance with the present invention can also be implemented using a first device (e.g., a controller) that manages the processor. In one such embodiment, with reference to FIG. 1, the controller monitors the temperature of processor unit 13 using temperature monitor 15. The controller can also monitor the operating frequency of processor unit 13 by monitoring variable frequency generator 14. The controller can also be coupled to variable voltage generator 12, so that the controller can monitor and control the amount of voltage being supplied to processor unit 13.

In one embodiment, the controller operates in response to commands from processor unit 13. That is, the controller and processor unit 13 operate in conjunction to establish the operating conditions of processor unit 13. In another embodiment, the controller establishes the operating conditions for processor unit 13 without commands from processor unit 13. For example, based on the current operating conditions of processor unit 13, the controller can change the amount of voltage supplied to processor unit 13 and the operating frequency of processor unit 13. The amount of collaboration between the controller and the processor unit 13 is implementation-specific. In general, embodiments in accordance with the present invention can be implemented with an external controller that manages processor unit 13, or without such a controller. More generally, embodiments of the present invention can be implemented in a computer system that has the capability to vary the voltage supplied to the processor and the operating frequency of the processor, or using a processor that provides that capability. However, as will be seen, embodiments of the present invention can also be of benefit when the supply voltage and operating frequency of the processor cannot be adjusted.

Figure 2:
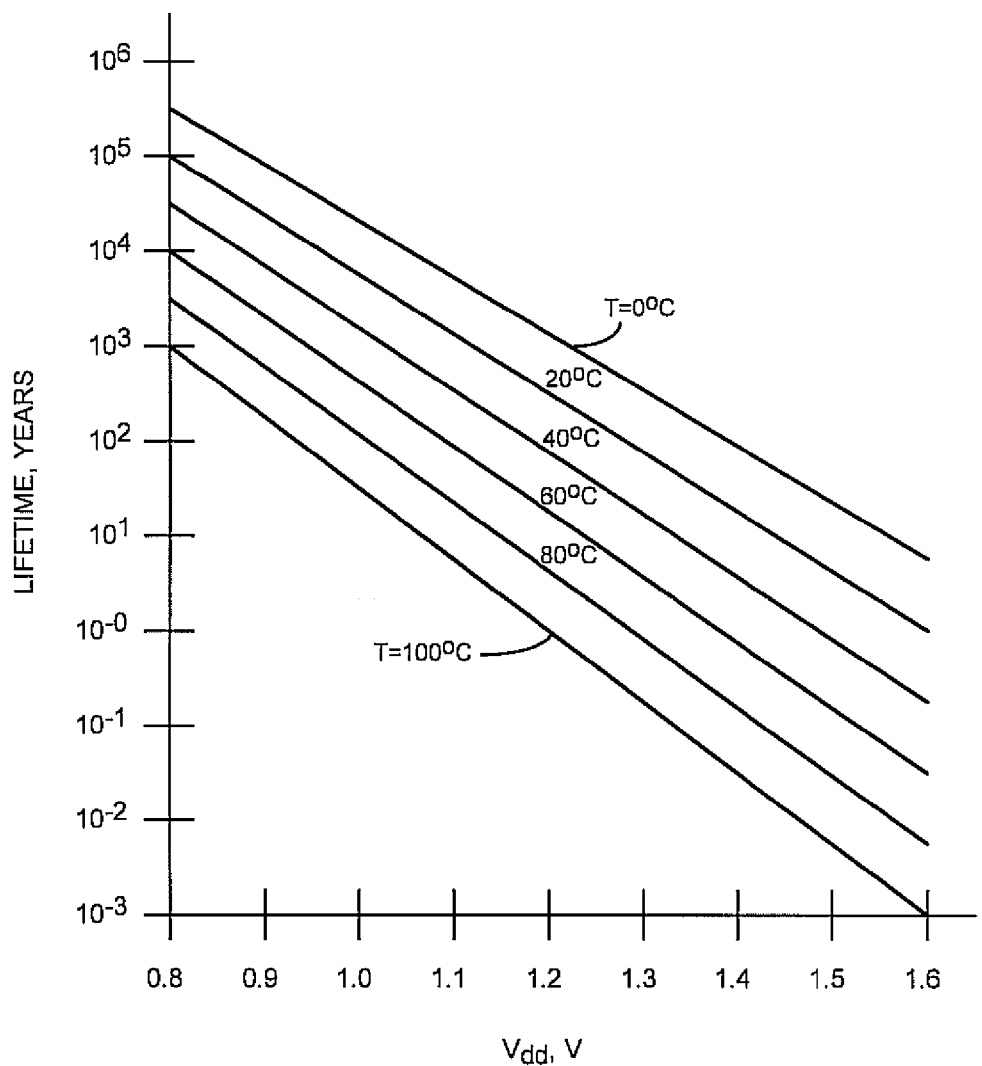
FIG. 2 illustrates an example of a plot of operating life versus voltage according to one embodiment of the present invention.

FIG. 2 is a graph illustrating processor operating lifetime versus the voltage supplied to the processor (Vdd) according to one embodiment of the present invention. FIG. 2 is illustrative only. In other words, the relationship between processor operating lifetime and Vdd may be different than that shown by FIG. 2.

As used herein, "processor operating lifetime" refers to the total amount of time that the processor is turned on (powered). Only the time in which the processor is actually powered is accumulated toward the processor's operating lifetime. Thus, an operating lifetime of 10 years does not refer to 10 calendar years, but instead refers to 10 years (87,600 hours) of powered operation.

FIG. 2 shows processor operating lifetime as a function of both Vdd and processor temperature (e.g., junction temperature). According to FIG. 2, for a given processor temperature, processor lifetime decreases as Vdd increases. As processor temperature increases, processor lifetime decreases (see also FIG. 3, below).

Figure 3:
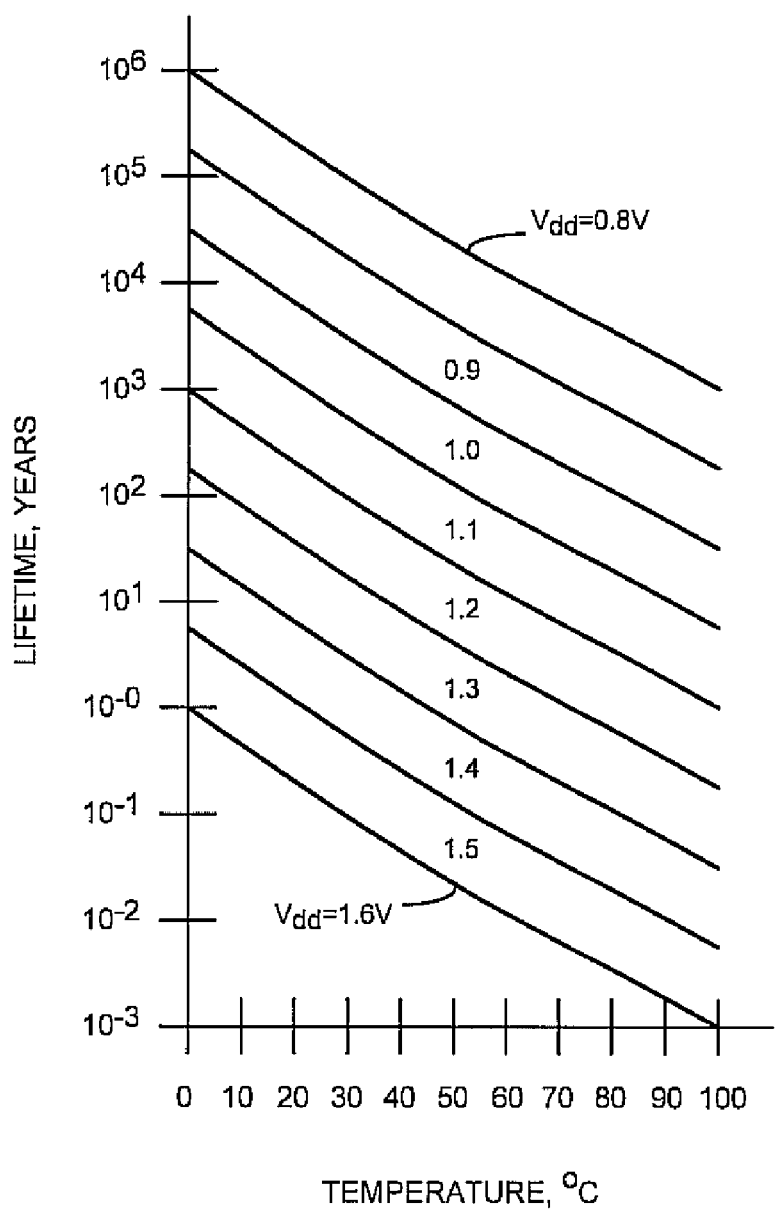
FIG. 3 illustrates an example of a plot of operating life versus temperature according to one embodiment of the present invention.

FIG. 3 is a graph illustrating processor operating lifetime versus processor temperature (e.g., junction temperature) according to one embodiment of the present invention. FIG. 3 is illustrative only. In other words, the relationship between processor operating lifetime and processor temperature may be different than that shown by FIG. 3. In actuality, the data plotted in FIG. 3 is consistent with the data plotted in FIG. 2.

FIG. 3 shows processor operating lifetime as a function of both processor temperature and Vdd. According to FIG. 3, for a given Vdd, processor lifetime decreases as processor temperature increases. As Vdd increases, processor lifetime decreases.

Operating parameters other than Vdd and processor temperature can be considered when evaluating processor lifetime. Such parameters include, but are not limited to, a bias voltage (e.g., a body bias voltage) that is applied to the processor, current per unit line width in metal interconnects, and current per contact or via. A body bias voltage Vnw may be applied to positive-channel metal-oxide semiconductor (PMOS) devices, and a body bias voltage Vpw may be applied to negative-channel metal-oxide semiconductor (NMOS) devices.

There are a number of failure mechanisms that can affect the operating lifetime of a processor. These failure mechanisms include, but are not limited to, Time Dependent Dielectric Breakdown (TDDBn and TDDBp, for NMOS and PMOS devices, respectively), Hot Carrier Injection (HCI), and Electromigration. FIGS. 2 and 3 illustrate the relationship between Vdd, processor temperature, and operating lifetime for only one such failure mechanism. Plots of operating lifetime versus Vdd and processor temperature, similar to that of FIGS. 2 and 3, can be generated for each of the various failure mechanisms considered.

Using information such as that presented in FIG. 2 or 3 for each failure mechanism being considered, a predicted processor lifetime can be determined supposing that the processor operates according to a given Vdd and temperature. In essence, the predicted processor lifetime is the time to failure. Thus, for example, using a figure such as FIG. 2 or 3 for HCI, the amount of time until a processor fails due to HCI can be predicted depending on the operating conditions (e.g., the Vdd and temperature) of the processor.

In one embodiment, the predicted processor lifetime (g) at a particular voltage (V) and temperature (T) is defined as the minimum of the predicted processor lifetimes (e.g., $g_{HCI}$, $g_{TDDBp}$, $g_{TDDBn}$, etc.) associated with each of the failure mechanisms being considered. That is, $$g(V,T)=\min(g_{HCI}(V,T), \text{ or } g_{TDDBp}(V,T), \text{ or } g_{TDDBn}(V,T), \text{ etc.}), \quad (1)$$

where the predicted processor lifetime has units of time (e.g., years).

In other words, in one embodiment, for a given voltage and temperature, the predicted processor lifetime g is established by the failure mechanism that is most limiting—the failure mechanism that will result in earliest failure of the processor. One failure mechanism may be limiting for one set of operating conditions (e.g., a particular voltage and temperature, or a range of voltages and temperatures), and another failure mechanism may be limiting for another set of operating conditions (e.g., a particular voltage and temperature, or a range of voltages and temperatures).

According to embodiments of the present invention, a time scale factor (f) is defined as the ratio of the target or design operating lifetime to the predicted operating lifetime. That is, for a given voltage and temperature, $$f(V,T)=[\text{design lifetime}]/[g(V,T)], \quad (2)$$

where the design operating lifetime is specified by the designer or user, the predicted operating lifetime g is given by equation (1) above, V is the voltage supplied or applied to the processor (e.g., Vdd, Vnw, or Vpw), and T is the temperature of the processor (e.g., the junction temperature or the ambient temperature). For a design (target) lifetime of 10 years, for example, $$f(V,T)=(10 \text{ years})/[g(V,T)], \quad (3)$$

where the predicted processor lifetime g has units of time (e.g., years). The time scale factor f is dimensionless.

Note that, in one embodiment, the value of voltage can be changed over the operating lifetime of the processor, as explained above in conjunction with FIG. 1. Also, the temperature of the processor can change over the operating lifetime of the processor (e.g., due to the changes in voltage, changes in computational workload, or perhaps due to changes in the ambient temperature). Accordingly, the value of the time scale factor (f) can also change over the operating lifetime of the processor. In some cases, the value of f can change hundreds of times per second.

At any given time, the value of the time scale factor provides an indication of how rapidly the processor is aging relative to its design operating lifetime. If f equals one (1), then at that point in time the processor is aging at the design rate (the rate that corresponds to the design operating lifetime). If f is less than 1, then at that point in time the processor is aging at less than the design rate (and is thus predicted to have an operating lifetime that will exceed the design operating lifetime). If f is greater than 1, then at that point in time the processor is aging at greater than the design rate (and is thus predicted to have an operating lifetime that will fall short of the design operating lifetime).

Figure 4:
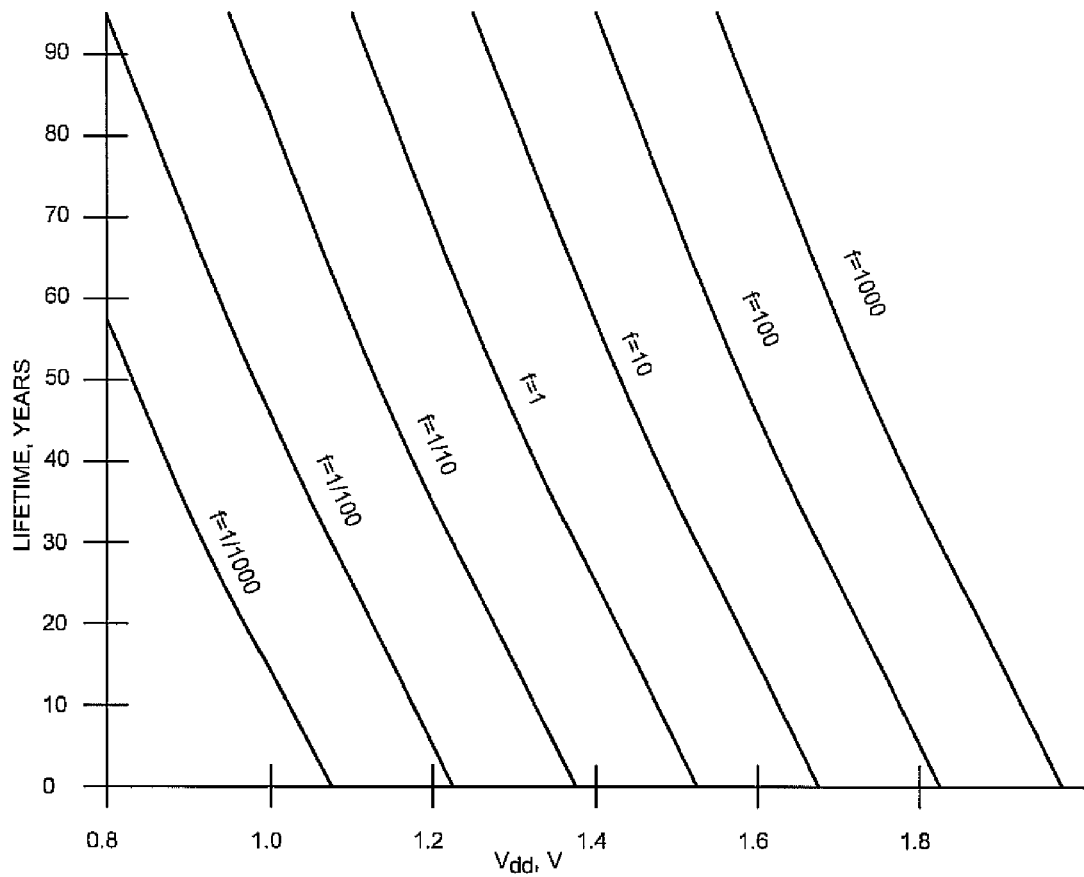
FIG. 4 illustrates an example of a plot of scaling factors as a function of voltage and temperature, used for determining effects on operating life according to one embodiment of the present invention.

FIG. 4 illustrates an example of a plot of time scale factors (f) as a function of voltage and temperature according to one embodiment of the present invention. FIG. 4 is derived based on equations (1) and (3) above. That is, FIG. 4 considers different types of failure mechanisms and, for each combination of V and T, the corresponding value of f is based on the failure mechanism that is limiting. However, a plot similar to that of FIG. 4 can be generated for each failure mechanism being considered. Also, FIG. 4 is derived using a design operating lifetime of 10 years; however, the present invention is not so limited. That is, design lifetimes of other than 10 years may be used. A design lifetime can be specified according to the particular needs and desires of the user.

In the example of FIG. 4, a value of f equal to ¹⁄₁₀, for instance, means that at a particular point in time, the processor is aging at rate that is ¹⁄₁₀ as fast as the design rate. A value of f equal to 10, for instance, means that at a particular point in time, the processor is aging at a rate that is 10 times faster than the design rate.

To achieve a design operating lifetime of 10 years, for example, the integral of the time scale factor over time (from zero to 10 operating years) should be less than or equal to 10 years, or $$f(V_1,T_1)\Delta t_1+f(V_2,T_2)\Delta t_2+\ldots+f(V_n,T_n)\Delta t_n \leq 10 \text{ years}, \quad (4)$$

where $\Delta t_i$ represents the amount of time (in fractions of years) that the processor is operated according to a particular voltage ($V_i$) and temperature ($T_i$), and where the time scale factor f is determined using equations (1) and (3) above.

For a processor such as processor unit 13 of FIG. 1, in which the supply voltage can be adjusted, various types of operating policies can be invoked in order to achieve the design operating lifetime. One such policy requires that the time scale factor never exceed 1. That is, in one embodiment, the processor is always operated according to voltage and temperature conditions that, when included in equation (2) above, do not result in a value of f that is more than 1. At a particular point in time, the processor temperature will have a certain value, and associated with that temperature is a voltage (e.g., Vdd) that corresponds to a time scale factor equal to 1 (refer to FIG. 4). Accordingly, a policy can be implemented in which the processor temperature is measured, and then a value for the voltage supplied to the processor is selected such that the time scale factor is less than or equal to 1. The processor is then operated using that voltage, which subsequently can be dynamically changed in response to a significant change in processor temperature.

Other policies that can be invoked involve keeping track of both the amount of time that the processor unit 13 (FIG. 1) is operated with f greater than 1, the amount of time that the processor is operated with f less than 1, and the value of f during each such amount of time. Operation with f less than 1 can be used to at least partially offset operation with f greater than 1, and vice versa, depending on the amount of time that the processor operated with f less than 1, the value of f<1 during that time, the amount of time that the processor operated with f greater than 1, and the value of f>1 during that time.

For example, if f is less than 1 for a period of time, then over that period of time the processor aged slower than its design rate, and as a result the processor is predicted to exceed its design operating lifetime (that is, its predicted operating lifetime is greater than its design operating lifetime). The amount of divergence between the predicted operating lifetime and the design operating lifetime depends on both the amount of time the processor operated with f less than 1 and the value(s) of f during that time. Nevertheless, because the predicted operating lifetime is greater than the design operating lifetime, the processor can subsequently be operated for another period of time with f greater than 1. Operation with f greater than 1 is referred to herein as "sprinting."

According to the scenario described in the preceding paragraph, the predicted operating lifetime is greater than the design operating lifetime, and consequently operation with f greater than 1 can be permitted for a limited period of time without reducing the predicted (overall) operating lifetime to less than the design operating lifetime. That is, the processor is permitted to sprint for a period of time that is equivalent in its effect on operating lifetime to the period of time that the processor was operated at less than its operating limits.

Conversely, if f is greater than 1 for a period of time, then over that period of time the processor aged faster than its design rate. The processor can then be operated for another period of time with f less than 1, to offset at least in part the accelerated rate of aging attributable to the operation with f greater than 1.

An approach for determining how long a processor can be permitted to sprint, without shortening its predicted operating lifetime, is now described. As mentioned above, the amount of time that the processor operates with f less than 1 and the amount of time that the processor operates with f greater than 1 are measured and recorded. In one embodiment, a credit and debit type of accounting is utilized to determine the net effect of operation with f less than 1 and f greater than 1.

For simplicity of discussion, the measure of net effect or net divergence is referred to herein as "credit-seconds" (e), where $$e = \Sigma(\Delta t_i)(1 - f(V_i, T_i)), \quad (5)$$

where voltage and temperature can vary with time, $\Delta t_i$ refers to the amount of time (in seconds or fractions thereof) that the voltage equals V, and that the temperature equals $T_i$ and e is measured in seconds (in general, e has the same units as $\Delta t_i$). Recall that f is dimensionless.

Credit-seconds can have a value of zero, a positive value or a negative value. If the credit-seconds value (e) is positive, then the processor is aging at a rate that is slower than the design rate. If the value of e is negative, then the processor is aging at a rate that is faster than the design rate. If the value of e is zero, then the processor is aging at a rate that is equal to the design rate.

By keeping track of the net effect on predicted operating life using credit-seconds, for example, a number of different operating policies are available. According to one policy, if e is less than zero (0), then operation with f greater than 1 is prohibited; only operation with f equal to or less than 1 is permitted. Operation with f less than 1 will result in the accumulation of positive credit-seconds that will eventually cause the value of e to reach or exceed 0, at which point operation with f greater than 1 becomes permissible.

Alternatively, a threshold value can be defined for e, such that if e is not more negative than the threshold value, then operation with f greater than 1 is permissible until the threshold value is reached. In other words, if e is less than 0, operation with f greater than 1 is permissible but limited; e is allowed to become more negative, but only to the limit set by the threshold value. In effect, the threshold value enforces a time limit on how long the processor can operate with f greater than 1 (where the time limit depends on the value of f).

Note also that a policy can be invoked in which the rate at which negative credit-seconds are accumulated is limited. Such a policy can be implemented by placing a limit on the size of the time scale factor (f) when f is greater than 1.

According to another policy, if e is positive, then operation with f greater than 1 is permissible but only for an amount of time τ, where $$\tau = e/(f-1), \quad (6)$$

where τ has the same units as e (e.g., seconds).

In one embodiment, the cumulative or net value of credit-seconds (e.g., the net effect of operation with f greater than 1 and f less than 1) is stored in nonvolatile memory 16 (FIG. 1). As such, when computer system 10 or processor unit 13 is turned off, the cumulative value of credit-seconds persists in memory and is available for use the next time the computer system or processor is powered on. Saving the cumulative value of credit-seconds in nonvolatile memory is advantageous because it means that there will be an opportunity to offset negative credit-seconds at a later time even if the processor or computer system is turned off. Without assurance of such an opportunity, the value of credit-seconds could not be allowed to go negative.

Operating conditions for processor unit 13 can be established on the fly or a priori. In the former case, for example, the processor can determine that a series of processor-intensive instructions have been furnished for the processor to execute. Accordingly, the processor issues commands that result in it being supplied with higher voltage so that it can operate at a higher frequency. As a result, the processor operates for a period of time with f greater than 1. The processor can quantify the effect of this operation by calculating a value of e (in this case, negative credit-seconds are accumulated). The processor can then select a new operating condition (e.g., a reduced voltage) that results in operation with f less than 1 for a period of time sufficient to offset the negative value of e. The processor issues commands to implement the new operating condition. After operation with f less than 1 for the period of time needed to offset the negative value of e, the processor again issues commands to implement another new operating condition (e.g., a higher voltage relative to the current voltage) that results in operation with f substantially equal to 1. Thus, operating conditions are established on the fly by the processor, based on its operating history. Note that, depending on the operating policy that is invoked, operation with f less than 1 does not necessarily have to continue until the negative value of e is totally offset, as described above.

Alternatively, operating conditions for processor unit 13 can be scripted in advance, in particular for situations that the processor can be expected to encounter. For example, the instructions that the processor will execute when the computer system is booting up are known in advance. To increase the speed of boot up, the processor can be instructed to operate with f greater than 1 for a prescribed period of time. Based on experience, the prescribed time period is expected to be sufficient for the processor to complete the actions normally undertaken during boot up. Then, the processor can be instructed to operate with f less than 1 for a subsequent prescribed time period in order to compensate for the prior accelerated activity.

As mentioned previously herein, there are a number of different failure mechanisms that can affect processor lifetime. For the embodiments described above, the time scale factor f is determined by considering the failure mechanism that is most limiting as a function of voltage and temperature (refer to equation (1) above).

In another embodiment, a time scale factor $f_j$ can be defined for each failure mechanism (j) being considered. That is, for a given voltage and temperature and a design (target) lifetime of 10 years, $$f_j(V,T)=10 \text{ years}/[g_j(V,T)], \quad (7)$$

where $g_j(V, T)$ is the predicted lifetime for failure mechanism j at voltage V and temperature T, measured in years.

Accordingly, for each failure mechanism j, a corresponding measure of net effect or net divergence $e_j$ (in credit-seconds) is given by $$e_j=\Sigma(\Delta t_i)(1-f_j(V_i,T_i)), \quad (8)$$

where voltage and temperature can vary with time, $\Delta t_i$ refers to the amount of time that the voltage equals. $V_i$ and that the temperature equals $T_i$ and $e_i$ has the same units as $\Delta t_i$ (e.g., seconds).

Operating policies can therefore be implemented depending on which failure mechanism is of most interest or concern. According to one policy, similar to equation (6) above, a failure mechanism-dependent time value $\tau_j$ is defined, where $$\tau_j=e_j/(f_j-1), \quad (9)$$

where $\tau_j$ has the same units as $e_j$.

In the present embodiment, a value of $\tau_j$ is determined for each failure mechanism j. In one embodiment, if every value of $\tau_j$ is positive, then operation with f greater than 1 is permissible but only for the amount of time that corresponds to the smallest value of $\tau_j$. However, there may be situations in which operation at a particular voltage and temperature has a positive effect on $e_j$ for one failure mechanism and a negative effect on $e_j$ for another failure mechanism. That is, there may be instances in which, for a particular V and T, $f_j$ is less than 1 for one failure mechanism but greater than 1 for another failure mechanism. Operating policies can be developed for those situations in which it is desirable to consider each failure mechanism separately from the others.

Also, if there are multiple voltage domains that can experience different voltages (e.g., Vdd, the NMOS body bias voltage Vnw, and the PMOS body bias voltage Vpw), then by modifying the equations above a value of e can be determined and applied for each voltage domain.

Figure 5:
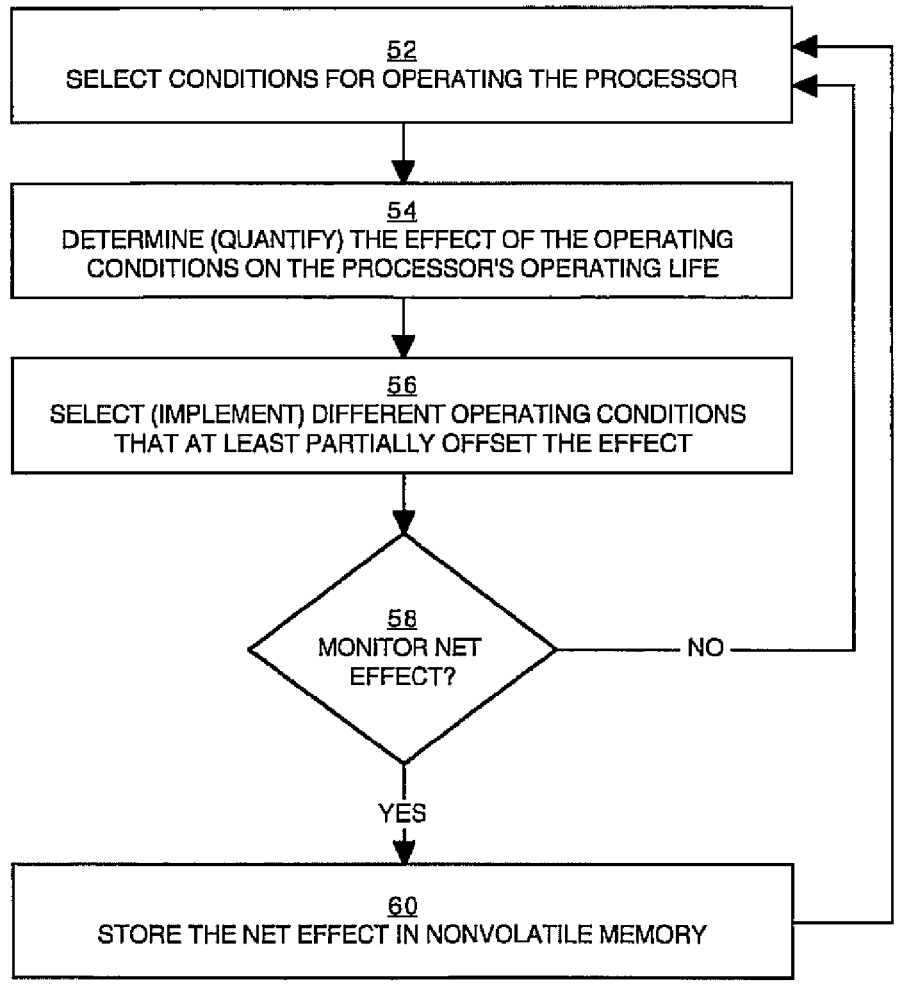
FIG. 5 is a flowchart of a method for operating a processor in accordance with one embodiment of the present invention.

FIG. 5 is a flowchart 50 of a method for operating a processor (e.g., processor unit 13 of FIG. 1) in accordance with one embodiment of the present invention. Although specific steps are disclosed in flowchart 50, such steps are exemplary. That is, embodiments of the present invention are well-suited to performing various other steps or variations of the steps recited in flowchart 50. It is appreciated that the steps in flowchart 50 may be performed in an order different than presented, and that not all of the steps in flowchart 50 may be performed.

In step 52 of FIG. 5, a first operating condition for the processor is selected and the processor is operated according to that first operating condition. The first operating condition may correspond to a value for Vdd, Vnw or Vpw, for example. The first operating condition can instead be selected based on the type of instructions that the processor will be executing, or based on other considerations. The temperature of the processor is monitored as the processor operates at the first operating condition.

For example, during boot up or during a period in which the processor is faced with executing relatively demanding instructions, a value of Vdd can be selected that allows the processor to operate at a higher frequency. Conversely, if the processor has entered a quiescent period, or if the instructions to be executed are not processor-intensive, then the processor can operate at a lower frequency and a value of Vdd can be selected accordingly, so that the processor is perhaps operating at less than its design operating limits.

In step 54, in the present embodiment, a determination is made as to whether the selected (first) operating condition, including processor temperature, has an effect on the operating lifetime of the processor. If there is an effect, the effect may be a positive effect or a negative effect. For example, if the processor is operating with f greater than 1, then a negative effect on the operating lifetime will be experienced (the predicted lifetime will be less than the design lifetime). Conversely, if the processor is operating with f less than 1, then a positive effect on the operating lifetime will be experienced (the predicted lifetime will be greater than the design lifetime). Using equation (5), for example, the effect on operating lifetime can be quantified.

In step 56, in the present embodiment, a different (second) operating condition is selected. The second operating condition is selected so that the effect of the prior (first) operating condition on operating lifetime will be at least partially offset by operation of the processor at the second operating condition.

For example, if operation at the first operating condition resulted in f being greater than 1, then the second operating condition is selected to compensate for the negative effect on operating lifetime introduced by operating at the first operating condition. In general, the second operating condition is selected in light of, and with the goal of achieving, the processor's expected operating lifetime. In effect, the processor is aware of its expected operating lifetime (e.g., 10 years) and, based on its operating history, the processor is also able to assess its predicted operating lifetime. The processor can then select a second operating condition that either takes credit for or compensates for its operating history, aligning its predicted operating lifetime with its expected operating lifetime.

Then, at some point in time that depends on the operating policy being invoked, a transition is made from the first operating condition to the second operating condition. For example, as presented above, operation according to the first operating condition may be permitted for a period of time even if f is greater than 1.

Upon changing to the new (second) operating condition, the effect on operating lifetime is quantified considering processor operation according to the second operating condition and according to processor temperature.

In step 58, in one embodiment, the cumulative (net) effect on operating lifetime may or may not be tracked. If not, flowchart 50 returns to step 52. If so, flowchart 50 continues to step 60.

In step 60, in one embodiment, the net effect on operating lifetime of processor operation at the first and second operating conditions is quantified and stored in nonvolatile memory. By considering the net cumulative effect, subsequent decisions can be made regarding which processor operating conditions can and should be selected and implemented, and for how long. The process described by flowchart 50 can then be repeated for each new operating condition.

In summary, embodiments of the present invention provide methods and systems for operating a semiconductor device (e.g., a processor) that can account for those times at which the device operates at less than its specified operating limits. By properly accounting for the time at which the device is operating at less than its operating limits, the device can be operated at higher temperatures, voltages and frequencies for equivalent periods of time (equivalent in effect if not equivalent in length), without shortening the predicted operating lifetime of the processor. Even if the operating conditions (e.g., supply voltage) cannot be adjusted, embodiments in accordance with the present invention permit the impact of the operating conditions on processor lifetime to be evaluated.

Embodiments in accordance with the present invention are thus described. While the present invention has been described in particular embodiments, it should be appreciated that the present invention should not be construed as limited by such embodiments, but rather construed according to the below claims.

What is claimed is:

1. A method comprising:
   accessing a first operating condition associated with operation of a semiconductor device;
   accessing a semiconductor device temperature value with said semiconductor device operating in accordance with said first operating condition;
   determining an amount of divergence from a design operating life as a result of said semiconductor device operating according to said first operating condition at said semiconductor device temperature value; and
   changing said first operating condition to a second operating condition, wherein said second operating condition is selected based upon said design operating life specified for said semiconductor device and said semiconductor device temperature value, wherein operating said semiconductor device according to said second operating condition offsets at least a portion of said amount of divergence, and wherein subsequent to said changing, said semiconductor device operates in accordance with said second operating condition.

2. The method of claim 1 further comprising maintaining a cumulative value of said amount of divergence.

3. The method of claim 2 wherein said cumulative value is stored in nonvolatile memory.

4. The method of claim 1 further comprising determining a time scale factor using said first operating condition and said semiconductor device temperature value, wherein said time scale factor and an amount of time at said first operating condition and at said semiconductor device temperature value are used to determine said amount of divergence.

5. The method of claim 4 wherein said time scale factor comprises a ratio of said design operating life and a predicted operating life, said predicted operating life determined based on said semiconductor device operating according to said first operating condition and said semiconductor device temperature value.

6. The method of claim 4 further comprising:
   determining a plurality of time scale factors using said first operating condition and said semiconductor device temperature value, said time scale factors each associated with a respective semiconductor device damage mechanism;
   using said time scale factors and said amount of time to determine a plurality of divergences from said design operating life, said divergences each associated with a respective semiconductor device damage mechanism; and
   selecting said second operating condition using said plurality of divergences.

7. The method of claim 1 wherein said first and second operating conditions are selected from the group consisting of semiconductor device supply voltage, semiconductor device operating voltage, bias voltage applied to said semiconductor device, and semiconductor device operating frequency.

8. A method comprising:
   selecting a first operating condition for a semiconductor device, wherein said first operating condition is selected according to instructions being executed by said semiconductor device;
   monitoring semiconductor device temperature with said semiconductor device operating according to said first operating condition;
   quantifying an effect of said first operating condition and said semiconductor device temperature on a design operating life specified for said semiconductor device; and
   changing said first operating condition to a second operating condition with said semiconductor device continuing to operate, wherein operation of said semiconductor device according to said second operating condition at least partially offsets said effect.

9. The method of claim 8 further comprising:
   operating said semiconductor device according to a plurality of operating conditions and semiconductor device temperatures over time; and
   maintaining a cumulative value comprising a total effect on said design operating life of said plurality of operating conditions and said semiconductor device temperatures, wherein said cumulative value comprises a summation of effects of said operating conditions and said semiconductor device temperatures on said design operating life.

10. The method of claim 9 wherein said cumulative value is stored in nonvolatile memory.

11. The method of claim 8 further comprising determining a time scale factor using said first operating condition and said semiconductor device temperature, wherein said time scale factor and an amount of time at said first operating condition and at said semiconductor device temperature are used to determine said effect.

12. The method of claim 11 wherein said time scale factor comprises a ratio of said design operating life and a predicted operating life, said predicted operating life determined supposing said semiconductor device operates according to said first operating condition and said semiconductor device temperature.

13. The method of claim 8 further comprising:
  determining a plurality of effects on said design operating life, said effects each associated with a respective semiconductor device damage mechanism; and
  selecting said second operating condition using said plurality of effects.

14. The method of claim 8 wherein said first and second operating conditions are selected from the group consisting of semiconductor device supply voltage, semiconductor device operating voltage, bias voltage applied to said semiconductor device, and semiconductor device operating frequency.

15. The method of claim 8 further comprising transitioning operation of said semiconductor device according to said first operating condition to said second operating condition after a specified period of time in order to limit said effect, wherein said semiconductor device is then operated according to said second operating condition.

16. A computer system comprising:
  a semiconductor device;
  a temperature monitor coupled to said semiconductor device and operable for monitoring semiconductor device temperature; and
  a nonvolatile memory unit in communication with said semiconductor device, wherein said semiconductor device is operable according to a first operating condition and is further operable to be changed from said first operating condition to a second operating condition, wherein said second operating condition is selected based upon a design operating life specified for said semiconductor device and said semiconductor device temperature, wherein said second operating condition is selected so that said semiconductor device operation according to said second operating condition offsets at least a portion of an effect on said design operating life caused by semiconductor device operation according to said first operating condition at said semiconductor device temperature, and wherein said semiconductor device is then operable in accordance with said second operating condition.

17. The computer system of claim 16 wherein said effect is one of a plurality of effects, said effects each associated with a respective semiconductor device damage mechanism.

18. The computer system of claim 16 wherein a time scale factor corresponding to an amount of time at said first operating condition and at said semiconductor device temperature is used to determine said effect.

19. The computer system of claim 18 wherein said time scale factor comprises a ratio of said design operating life and a predicted operating life, said predicted operating life determined supposing said semiconductor device operates according to said first operating condition at said semiconductor device temperature.

20. The computer system of claim 16 wherein said semiconductor device is operable according to a plurality of operating conditions and semiconductor device temperatures over time, wherein said semiconductor device maintains a cumulative value comprising a total effect on said design operating life of said plurality of operating conditions and said semiconductor device temperatures, said cumulative value comprising a summation of effects of said operating conditions and said semiconductor device temperatures on said design operating life.

21. The computer system of claim 20 wherein said cumulative value is stored in said nonvolatile memory.

22. The computer system of claim 16 wherein said first and second operating conditions are selected from the group consisting of semiconductor device supply voltage, semiconductor device operating voltage, bias voltage applied to said semiconductor device, and semiconductor device operating frequency.

* * * * *